Patented June 26, 1945

2,379,057

UNITED STATES PATENT OFFICE 2,379,057

METHOD OF MAKING ELECTRIC DISCHARGE DEVICE

James T. Anderson, Robert S. Wells, and William J. Scott, Rugby, England, assignors to General Electric Company, a corporation of New York No Drawing. Application December 19, 1939, Serial No. 310,018. In Great Britain January 16, 1939

1 Claim. (Cl. 117—26)

Our invention relates in general to electric discharge devices, and more particularly to electric discharge devices of the type in which luminescent or fluorescent powders are used to convert nonvisible radiations into visible radiations.

It is well known that when fluorescent powders are used inside electric discharge lamps (especially those operating with a low pressure mercury discharge) in order to utilize the non-visible radiations of the discharge and thus improve the luminous efficiency of the lamp and the color of the light, these powders tend to lose their efficiency.

It has been proposed to counteract this loss in efficiency by protecting the luminescent powders from the effects of the discharge and of the cathode emission and/or disintegration, by mixing certain compounds with the fluorescent powders, or by coating the fluorescent powder particles with certain compounds, or by protecting that portion of the powder screen nearest the discharge by means of a layer of silicon ester, or $P_2O_5$, or a thin continuous glass wall. These methods all have more or less serious objections, such as their greatly reducing the initial efficiency; also, difficulty of application or cost of the materials.

An object of our invention is to provide an improved method for the protection of the fluorescent screens or coatings of electric discharge devices.

The improved method according to the invention consists in providing a layer of protective material (which should be reasonably transparent to exciting and emitted radiations) on the inside surface of the luminescent or fluorescent screen by the chemical or physical reaction of two or more compounds or solutions thereof. The material, if any, which is used as the medium for binding the fluorescent material to the glass may or may not be one of the reacting compounds, and choice of the protecting material may depend on the nature of this binder.

The improved process consists in coating the inside of the fluorescent screen with a small amount of one of the reactants, followed by treatment with another of the reactants so that there is formed a compound suitable for a protective layer.

The protective layer may or may not be porous, and it may be applied either before or after the final baking of the fluorescent screen material on the glass depending, of course, on circumstances. For example, where the binder consists of a solution of a compound such as nitrocellulose, it is obviously necessary to remove the volatile products produced during the baking before applying the protective coating, or to allow means for their removal through the coating.

The process according to the invention is carried out by passing over the screen of fluorescent material already fixed to the inside of the glass tube or base member, a solution of one of the reactants used in the formation of the protective coating, allowing some of it to remain (where it may dry at least partially by natural or forced evaporation), and following this by similar treatment with the other reactant or reactants whereby the protective coating is deposited upon the screen. Excess of the reactants may be removed by suitable washing.

It will be understood that the strength of solution used is dependent upon the thickness of coating desired, the speed of the reaction involved, the rate of drying of the reactant solutions, etc.

As examples, the following three preferred methods are given, though it is to be understood that we do not limit ourselves to these.

(1) Where phosphoric acid or a soluble silicate is used as the binder, it may serve as the first reactant, or an additional amount thereof may be applied as the first reactant, to be followed by a second reactant which may be a solution of a calcium compound (preferably calcium hydroxide), the reaction between the binder and the calcium compound producing a protective coating of calcium silicate or phosphate.

(2) A solution of ethyl silicate may be used as the first reactant followed by a solution such as ammonium hydroxide or hydrochloric acid or water alone, or by a stream of wet ammonia or acid gas or wet air in order to form a deposit of silica as the protective coating.

(3) The materials may be strontium chloride and sodium phosphate, the one used as the second reactant being made strongly ammoniacal.

It will be understood that the amount and rate of heating and other treatments given to the reacting materials and the tube in general during the subsequent baking and evacuation will depend in part upon the nature of the protective coating used.

What we claim as new and desire to secure by Letters Patent of the United States is:

A method of protecting a coating of luminescent material on the inside of the discharge-enclosing wall of an electric discharge device against deterioration from effects of the discharge; which method comprises successively treating said luminescent coating throughout its extent with solutions of strontium chloride and of sodium phosphate, the last-applied of said solutions being strongly ammoniacal, whereby the luminescent material is covered on the exposed surfaces of its particles with a coating of solid strontium phosphate throughout the extent of the luminescent coating, without adverse effect on the luminescent material.

JAMES T. ANDERSON.
R. S. WELLS.
WILLIAM J. SCOTT.